United States Patent [19]

Saitoh et al.

[11] Patent Number: 4,958,327

[45] Date of Patent: Sep. 18, 1990

[54] ULTRASONIC IMAGING APPARATUS

[75] Inventors: Shiroh Saitoh, Yokohama; Mamoru Izumi, Tokyo; Syuzi Suzuki; Kazuhide Abe, both of Yokohama, all of Japan

[73] Assignee: Kabushiki Kaisha Toshiba, Kawasaki, Japan

[21] Appl. No.: 238,399

[22] Filed: Aug. 31, 1988

[30] Foreign Application Priority Data

Aug. 31, 1987 [JP] Japan ................................ 62-216660

[51] Int. Cl.[5] ................................ G01S 15/00

[52] U.S. Cl. ................................ 367/7; 367/137; 367/903

[58] Field of Search .................... 367/7, 157, 155, 137, 367/903; 73/620; 128/662.03, 660.01

[56] References Cited

U.S. PATENT DOCUMENTS 4,805,458 2/1989 Yoshie ................................ 73/620

FOREIGN PATENT DOCUMENTS 56-69999 8/1981 Japan .

61-69298 8/1986 Japan .

*Primary Examiner*—Thomas H. Yarcza

*Assistant Examiner*—Daniel T. Pihulic

*Attorney, Agent, or Firm*—Oblon, Spivak, McClelland, Maier & Neustadt

[57] ABSTRACT

An ultrasonic imaging apparatus includes an ultrasonic transducer for outputting an ultrasonic beam and converting the echo of the ultrasonic beam into an echo signal, a transmitter section for supplying a drive signal to the ultrasonic transducer, a receiver section for receiving the echo signal output from the ultrasonic transducer and converting the echo signal into an image signal, and a coaxial cable for coupling the ultrasonic transducer to the transmitter and receiver sections. The ultrasonic transducer is constituted by a two-layer ultrasonic transducer having an impedance smaller than an impedance of the coaxial cable.

14 Claims, 3 Drawing Sheets

ULTRASONIC IMAGING APPARATUS

BACKGROUND OF THE INVENTION

1. Field of the Invention

The present invention relates to an ultrasonic imaging apparatus using an ultrasonic transducer constituted by multi-layer piezoelectric elements.

2. Description of the Related Art

An ultrasonic transducer is constituted by piezoelectric elements. The ultrasonic transducer generates ultrasonic waves so that the internal state of an object is inspected by using the reflected ultrasonic waves. The ultrasonic transducer is used for diagnosis of the inside of a human body, flaw detection of the inside of a welded metal, and the like. An array type ultrasonic transducer constituted by an array of a plurality of piezoelectric elements is widely used.

A medical ultrasonic imaging apparatus is mainly used as an ultrasonic diagnosis apparatus for obtaining a tomographic image (B mode image) of the inside of a human body, i.e., the abdomen, further, can be used to form, in addition to a tomographic image, a so-called Doppler mode image for observing a blood flow rate in a heart, a carotid artery, or the like by utilizing the Doppler effect. Furthermore, in this ultrasonic diagnosis apparatus, color display of the blood, i.e., color mapping can be realized.

However, a sensitivity margin of the ultrasonic diagnosis apparatus including an ultrasonic transducer in observation of the blood is smaller than that in formation of a B mode image. This is based on the fact that a method of obtaining a signal using the Doppler mode is different from a method of obtaining a B mode image. Therefore, as the sensitivity of the ultrasonic transducer is increased, the quality of a Doppler mode image is noticeably improved compared with a B mode image.

Four methods of increasing the sensitivity of the ultrasonic transducer are available, namely, (1) an increase in a drive voltage, (2) improvement of an piezoelectric material, (3) acoustic matching, and (4) electrical matching. With regard to method (1), since the number of elements tends to be increased in recent or future ultrasonic transducers, most drive sources are constituted by hybrid ICs, and hence, it is difficult to apply a high drive voltage to an ultrasonic element. With regard to method (2), electromechanical coupling coefficiency $k_{33}$ of a piezoelectric ceramic material is about 0.7. In order to double ultrasonic sensitivity of the ultrasonic transducer by increasing the electromechanical coupling coefficiency, the value of $k_{33}$ must be set to be about 0.95. However, it is practically impossible to realize this value. With regard to method (3), since ultrasonic sensitivity and resolution generally conflict with each other, a great increase in ultrasonic sensitivity by acoustic matching cannot be expected without loss of resolution. In contrast to methods (1) to (3), according to method (4), ultrasonic sensitivity can be effectively increased because of the following reasons.

In the Doppler mode, an electronic sector scan type ultrasonic transducer is used. When the Doppler mode is to be executed, an ultrasonic beam must be obliquely radiated onto a blood vessel to be observed. In order to prevent grating robe due to this oblique radiation, the electronic sector scan type ultrasonic transducer is used because it has an element pitch smaller than that of an electronic linear scan type ultrasonic transducer, and hence, more suitable for the purpose.

The area of one element of the electronic sector scan type ultrasonic transducer is $\frac{1}{2}$ to $\frac{1}{4}$ that of the electronic linear scan type ultrasonic transducer. For this reason, an impedance per element of the electronic sector type ultrasonic transducer is larger than that of the electronic linear scan type ultrasonic transducer. If the impedance of an ultrasonic transducer element is large, the voltage loss of a reflected wave signal obtained from the transducer element occurs because of the electrostatic capacity of a coaxial cable connecting the ultrasonic transducer to a receiver section and/or the input impedance of the receiver section.

That is, the voltage of the reflected wave signal is considered to be determined by the ratio of the parallel combined impedance of the impedance determined by a cable capacitance and the input impedance of the receiver section, to the serial combined impedance of this parallel impedance and the impedance of the ultrasonic transducer. Hence, the higher the impedance of the ultrasonic transducers, the greater the voltage loss of the reflected wave signal. The imaging apparatus can be more sensitive to the ultrasonic waves if the impedance of the ultrasonic transducer is reduced. To reduce the impedance of the transducer, the following methods can be used.

The first method is to incorporate a piezoelectric element having a great dielectric constant into the transducer. However, the greatest relative dielectric constant that a piezoelectric element can have is 5000. Further, the greater the dielectric constant, the smaller the coupling coefficiency of the piezoelectric element, and the lower the Curie temperature.

According to the second method, an impedance converting means such as a coil, a transformer, or an FET is used. In this method, if the impedance converting means is incorporated in a head section of an ultrasonic transducer having several tens of elements or 100 or more elements, the size of the ultrasonic transducer is increased, resulting in degradation in operability of the ultrasonic transducer. In addition, since the impedance converting means has predetermined frequency characteristics, the operating band of the ultrasonic transducer is narrowed.

SUMMARY OF THE INVENTION

In the present invention, a so-called multi-layer piezoelectric element constituted by a plurality of piezoelectric layers which are laminated and electrically connected in parallel is used. Assuming that the number of layers is n, then the thickness per layer is 1/n in comparison with a single-layer piezoelectric having the same foundamental resonance frequency as the multilayer piezoelectric element. Since n layers are electrically connected in parallel, a total impedance is $1/n_2$. If, however, only the number of layers is increased to decrease the impedance, the ultrasonic transducer has characteristics exceeding the drive capacity of a transmitting circuit (drive source). As a result, the transmitting circuit cannot effectively apply a voltage to the ultrasonic transducer. This is because voltage division due to the output impedance of the drive source and the impedance of the ultrasonic transducer tends to interfere with application of a voltage to the ultrasonic transducer. For example, the impedance near the resonance point of a currently available 3.5-MHz electronic sector scan type ultrasonic transducer is about 300 to 500Ω.

When a multi-layer piezoelectric element is used, the ultrasonic transducer exhibits an impedance of 70 to 120Ω by using a two-layer piezoelectric element and 30 to 50Ω by using a three-layer piezoelectric element.

Since the output impedance of the drive source is determined by the ON resistance of a transistor or the like used as the drive source, it ranges from several Ω to several 10Ω. Accordingly, a drive pulse may not be effectively supplied to the ultrasonic transducer depending on the number of layers. Therefore, the number of layers is inevitably limited in terms of transmission sensitivity.

As described above, in an ultrasonic transducer using a multi-layer piezoelectric element, even if the impedance is decreased by increasing the number of layers, since effective application of a pulse tends to be interfered, a high-sensitivity ultrasonic transducer cannot be realized.

It is an object of the present invention to provide an ultrasonic imaging apparatus which can achieve high ultrasonic sensitivity by decreasing the loss of reflected wave signals, while maintaining a state wherein drive pulses are easily applied to a search unit, without greatly increasing the number of layers of a laminated piezoelectric element.

According to the present invention, the impedance of an ultrasonic transducer constituted by a multi-layer piezoelectric element is set to be smaller than that of a coaxial cable connecting the ultrasonic transducer to a receiver section.

The number of piezoelectric layers of the multilayer piezoelectric element is preferably two. When a two-layer laminated piezoelectric element is used, the impedance of the ultrasonic transducer is ¼ that of an ultrasonic transducer using a single-layer piezoelectric element, specifically, about 70 to 120Ω at an operating center frequency. With such a low impedance, a drive pulse voltage is not excessively decreased by the internal impedance of a drive source.

Since a doctor or an operator holds the ultrasonic transducer by a hand and operates it, the coaxial cable must have a length of 1 m or more. In order to limit the electrostatic capacitance of the coaxial cable below 60 pF/m, thin core wires must be used or the number thereof must be decreased, and at the same time, the thickness of a resin film covering each core wire must be increased.

As a coaxial cable connected to an array type ultrasonic transducer, a bundle coaxial cable is used, which is formed by bundling coaxial cables of the same numbers as that of the elements of the ultrasonic transducer and covering the bundle of the cables with neoprene rubber or the like. In such a coaxial cable bundle, each core wire is easily disconnected. In addition, since the diameter of this coaxial cable is increased, operability of the ultrasonic transducer is degraded. For this reason, the length and electrostatic capacitance of the coaxial cable are preferably set to be 1 m or more and 60 pF/m or more, respectively. In this case, the impedance of the coaxial cable becomes about 700Ω0 at a center frequency of 3.5 MHz. Since this impedance is a capacitive impedance, it is coupled to the impedance of the ultrasonic transducer in parallel in the circuit.

According to the present invention, since the impedance of the ultrasonic transducer is smaller than the parallel combined impedance of the input impedance of the receiver section and the impedance of the coaxial cable, the voltage of a reflected wave signal, which is divided by the parallel combined impedance, is increased, thereby minimizing the voltage loss of the reflected wave signal. Therefore, since reception sensitivity can be increased without excessively lowering the impedance of the ultrasonic transducer by increasing the number of layers of the multi-layer piezoelectric element, a drive pulse can be easily applied to the piezoelectric element and a decrease in transmission sensitivity can be suppressed. With this arrangement, transmission/ reception sensitivity of ultrasonic waves can be improved.

DETAILED DESCRIPTION OF THE PREFERRED EMBODIMENTS

Figure 1:
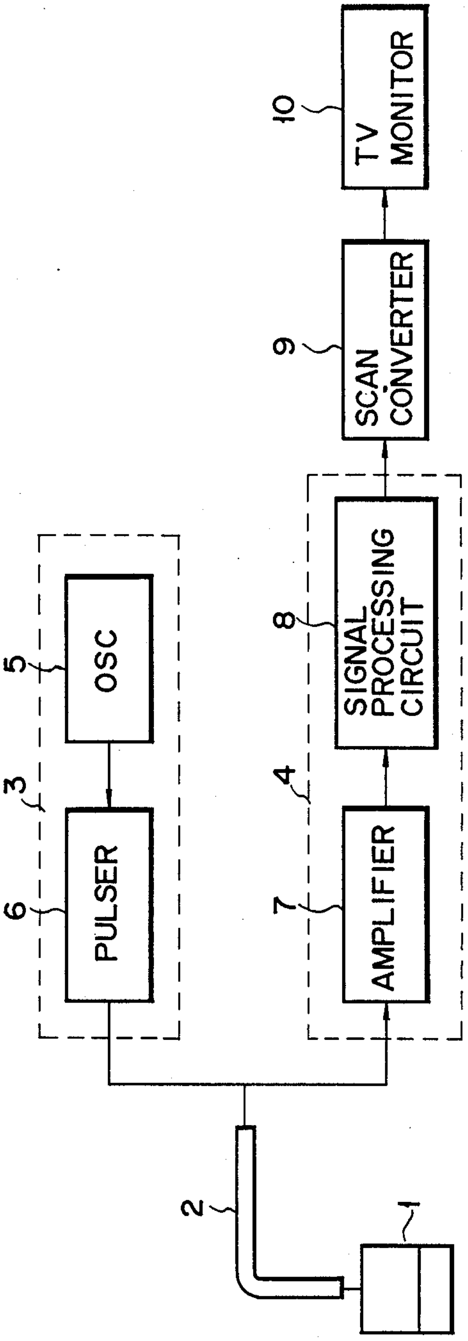
FIG. 1 is a block diagram showing an ultrasonic imaging apparatus according to an embodiment of the present invention.

According to an ultrasonic imaging apparatus shown in FIG. 1, ultrasonic transducer 1 is constituted by an array of a plurality of ultrasonic transducer elements (piezoelectric elements). Ultrasonic transducer 1 is connected to transmitter and receiver sections 3 and 4 through coaxial cable 2. Transmitter section 3 comprises clock oscillator 5 for outputting a clock and pulser 6 for outputting a drive pulse in response to the clock. When the drive pulse is supplied to ultrasonic transducer 1 through coaxial cable 2, ultrasonic transducer 1 outputs an ultrasonic beam. Ultrasonic transducer 1 converts the echoes of the ultrasonic beam into echo signals.

Receiver section 4 comprises amplifier 7 for amplifying the echo signals output from ultrasonic transducer 1 and signal processing circuit 8 for processing the amplified echo signals. The output terminal of signal processing circuit 8 is coupled to TV monitor 10 through scan converter 9.

Signal processing circuit 8 includes a circuit for converting the echo signal into a B mode signal and a circuit for converting the echo signal into a Doppler mode signal, and hence can output the B and Doppler mode signals. Note that, for example, U.S. Pat. No. 4,398,540 discloses a detailed arrangement of a circuit for obtaining the B and Doppler mode signals.

Figure 2:
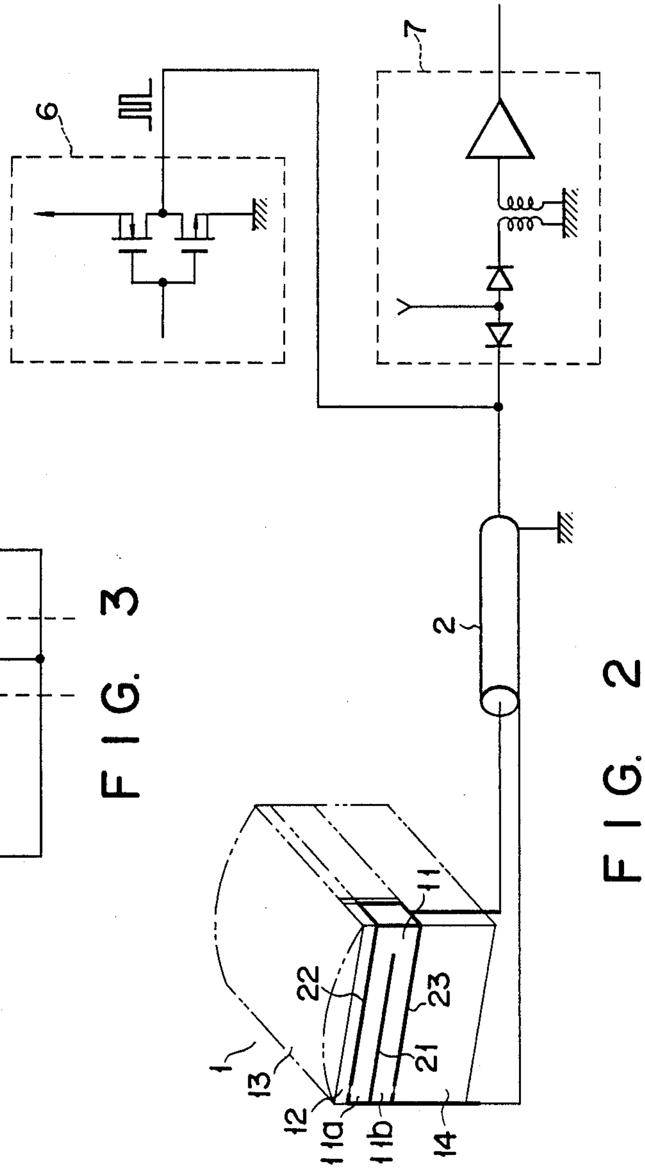
FIG. 2 is a circuit diagram showing a relationship among an ultrasonic transducer element, a cable, and transmitting and receiving circuits.

FIG. 2 shows a transmitting/receiving circuit system for one ultrasonic transducer element. Referring to FIG. 2, the ultrasonic transducer element is constituted by multi-layer piezoelectric element 11. Multilayer piezoelectric element 11 is constituted by two layers, i.e., piezoelectric layers 11*a* and 11*b*, each consisting of a piezoelectric ceramic material having a relative dielectric constant of, e.g., 2,000. Internal electrode layer 21 is interposed between piezoelectric layers 11*a* and 11*b*. External electrode layers 22 and 23 are respectively formed on surfaces of piezoelectric layers 11*a* and 11*b*, which are opposite to internal electrode layer 21. External electrode layers 22 and 23 are short-circuited on a side surface of element 11, so that piezoelectric layers 11*a* and 11*b* are electrically connected to each other in parallel.

Multi-layer piezoelectric element 11 is formed in such a manner that a green sheet obtained by, e.g., a doctor blade method, is used, a paste including Pt as a major constituent is baked as internal electrode layer 21, and then external electrode layers 22 and 23, each including Ag as a major constituent, are formed and baked. Two-layer piezoelectric 11 formed in such a manner has an impedance of 100Ω at the center frequency of an electronic sector probe.

A plurality of multi-layer piezoelectric elements 11, each having the above-described arrangement, are arranged in an array, and acoustic matching layer 12 and acoustic lens 13 are sequentially formed on an ultrasonic radiation surface of the element array. Backing member 14 is formed on a rear surface side of the element array to absorb ultrasonic waves and serve as a support.

In the above ultrasonic imaging apparatus, when pulser 6 outputs a drive pulse in response to a pulse from clock pulse oscillator 5, the drive pulse is supplied to ultrasonic transducer 1 through coaxial cable 2. Ultrasonic transducer 1 is driven by the drive pulse and outputs an ultrasonic beam. Upon reception of the echoes of the ultrasonic beam from an object to be imaged, ultrasonic transducer 1 converts the echoes into echo signals. The echo signals are supplied to receiving circuit 7 through coaxial cable 2, amplified by amplifier 7, and is processed by signal processing circuit 8. Signal processing circuit 8 converts the echo signals into B mode and Doppler mode signals, and outputs them to scan converter 9. Scan converter 9 converts the B mode and Doppler mode signals into TV signals and outputs them to TV monitor 10. TV monitor 10 displays the TV signals as a B mode image, i.e., a tomographic image, and a blood flow image.

Assume that in the above ultrasonic imaging apparatus, the drive source, i.e., the pulser, has an output impedance of 30Ω, the fundamental frequency (the resonance frequency of the ultrasonic transducer element) of a drive pulse is 3.5 MHz, the input impedance of receiver section 4, i.e., the input impedance of amplifier 7, is 750Ω, and coaxial cable 2 (electrostatic capacitance: 110 pF/m, length: 2 m) has an impedance of 180Ω. Under these conditions, when two-layer piezoelectric element 11 receives echoes from a target placed in water by a pulse echo method, and echo signals are output from two-layer piezoelectric 11 to receiver section 4, the transmission/reception sensitivity of the ultrasonic imaging apparatus can be measured from the levels of the reception signal and the echoes obtained by receiver section 4. Upon measurement of this sensitivity, the sensitivity of the ultrasonic imaging apparatus using two-layer piezoelectric 11 was 9 dB, assuming that the sensitivity of an ultrasonic imaging apparatus using the conventional single-layer piezoelectric (impedance: 450Ω) is set as a standard value (0 dB).

An improvement in sensitivity by the two-layer piezoelectric element will be described with reference to an equivalent circuit in FIG. 3.

Figure 3:
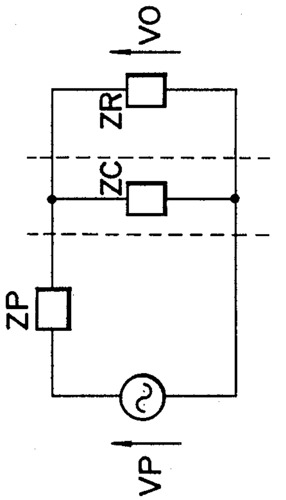
FIG. 3 is an equivalent circuit diagram of FIG. 2.

Referring to FIG. 3, reference symbol $Z_P$ denotes the impedance of piezoelectric element 11; $Z_C$, the impedance of coaxial cable 2; and $Z_R$, the impedance of the receiver section. As described above, impedances $Z_P$, $Z_C$, and $Z_R$ are respectively 100Ω, 180Ω, and 750Ω. A parallel impedance relationship of $Z_P<Z_C$ and $Z_R$ can be established. When impedance $Z_P$ of the ultrasonic transducer element is set to be lower than the parallel combined impedance of the coaxial cable and the receiver section, the echo level is less attenuated by the ultrasonic transducer element, and a large echo level signal is supplied to the receiver section, thereby improving the sensitivity of the apparatus.

In the conventional single-layer ultrasonic transducer element, since its impedance is 450Ω, and becomes considerably larger than the parallel impedance (145Ω) of the coaxial cable and the receiver section, the echo level is considerably attenuated by the impedance of the ultrasonic transducer element, thus degrading the sensitivity of the apparatus.

In the above embodiment, the impedance of the ultrasonic transducer element is set to be lower than the parallel combined impedance of the coaxial cable and the receiver section. In practice, however, it is only required that the impedance of the ultrasonic transducer element be smaller than that of the coaxial cable. That is, if $Z_P<Z_C$ is established, the principal object of the present invention can be achieved.

As described above, in order to improve the ultrasonic sensitivity of the ultrasonic transducer, it is only required that the impedance of the ultrasonic transducer element be set to be lower than at least the impedance of the coaxial cable. It is considered that in order to lower the impedance of the ultrasonic transducer element, the number of layers of the element is increased. For this reason, the present inventor measured ultrasonic sensitivity using a three-layer ultrasonic transducer element. The three-layer ultrasonic transducer element exhibited an impedance of 45Ω, which was lower than that (100Ω) of the two-layer ultrasonic transducer element. Upon ultrasonic sensitivity measurement, however, the three-layer ultrasonic transducer element exhibited an ultrasonic sensitivity of 8 dB, which was lower than that of the two-layer element, i.e., 9 dB. Therefore, it was found that the two-layer ultrasonic transducer element was optimal in ultrasonic sensitivity improvement.

This is because the ratio of the parallel combined impedance of the two-layer ultrasonic transducer and the coaxial cable to the parallel combined impedance of the three-layer ultrasonic transducer and the coaxial cable is greater than one, and the drive pulse is more effectively supplied to the two-layer ultrasonic transducer than to the three-layer one.

When the transmission sensitivities of the single-, two-, and three-layer ultrasonic transducers were compared with each other by using a hydrophone, they were respectively measured as 0 dB, 4 dB, and 2 dB. Generally, when the number of layers of a multi-layer piezoelectric element is increased, and an electric field per layer is increased, transmission sensitivity is increased in proportion to the number of layers. Assuming that there is no voltage drop in a drive pulse due to voltage division caused by the output impedance of drive source 6 and the impedance of the ultrasonic transducer, then the transmission sensitivities of the two- and three-layer structures are supposedly 6 dB and 9.5 dB, respectively when the transmission sensitivity of the single-layer structure is a standard value (0 dB). In practice, however, the transmission sensitivity of the three-layer structure was lower than that of the two-layer structure. This is because, as described above, if the number of layers is increased, a drive pulse tends not be voltage-divided to the ultrasonic transducer because of the drop in impedance of the ultrasonic transducer.

Figure 4:
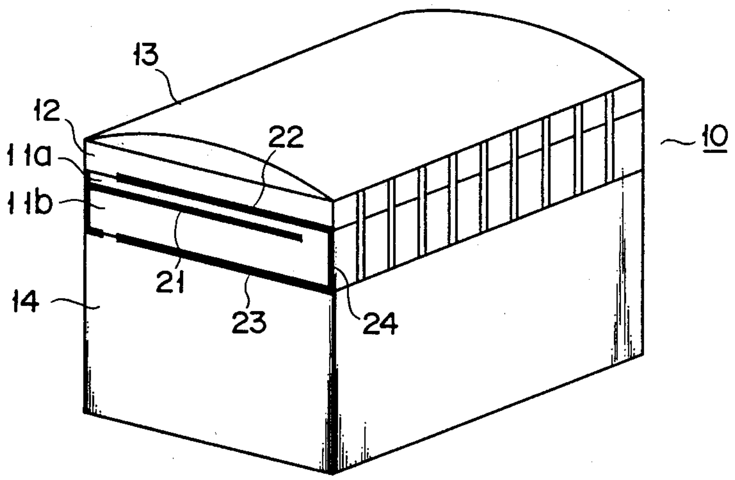
FIG. 4 is a perspective view showing an ultrasonic transducer as a modification used in the ultrasonic imaging apparatus of the present invention.

FIG. 4 shows a modification of ultrasonic transducer 1 used in the present invention. In ultrasonic transducer 1 in this modification, internal electrode layer 21 is not formed at substantially the center between external electrode layers 22 and 23, but is formed nearer to external layer 22 than to external layer 23. The capacitance of multi-layer piezoelectric element 10 becomes a minimum value when internal electrode layer 21 in FIG. 2 is located at the center between external electrode layers 22 and 23, and is increased when it is shifted from the center. Therefore, if the same piezoelectric material is used, the impedance of the ultrasonic transducer in FIG. 4 becomes smaller than that of the ultrasonic transducer in FIG. 2.

Similar to the multi-layer piezoelectric element in FIG. 2, multi-layer piezoelectric element 10 uses the green sheet obtained by the doctor blade method. The doctor blade method is effective in forming a thin film. Accordingly, a sheet having a minimum thickness of 30 μm can be formed as a firing substance. In this modification, multi-layer piezoelectric element 10 is formed by firing such that the thickness between internal and external electrode layers 21 and 22 is set to be 40 μm, and the thickness between internal and external electrode layers 21 and 23 is set to be 370 μm. After this firing process, the layers between internal and external electrode layers 21 and 22, and between layers 21 and 23 are independently polarized. In this case, directions of polarization are determined such that internal electrode layer 21 becomes positive. Upon polarization process, detour electrode 24 is soldered on the firing substance to connect external electrodes 22 and 22 to each other. With this process, multi-layer piezoelectric element 10 is completed.

According to multi-layer piezoelectric element in FIG. 4, its impedance became 47Ωat about a fundamental frequency, which was less than ½ that of the element wherein internal electrode 21 shown in FIG. 2 was formed at the center between external electrodes 22 and 23. The ultrasonic sensitivity of the apparatus was measured using a multi-layer piezoelectric element in FIG. 5 on the basis of echoes from a target placed in water by the pulse echo method. As a result, an ultrasonic sensitivity of 8.5 dB was obtained, assuming that the ultrasonic sensitivity of the single-layer element was 0 dB. Although this value is slightly smaller than that of the element in FIG. 2, an impedance higher than the above impedance (47Ω) can be obtained depending on the specifications (frequency and size per element) of the ultrasonic transducer. In such a case, the multi-layer piezoelectric element in this modification can be effectively used in a high-sensitivity ultrasonic imaging apparatus.

Figure 5:
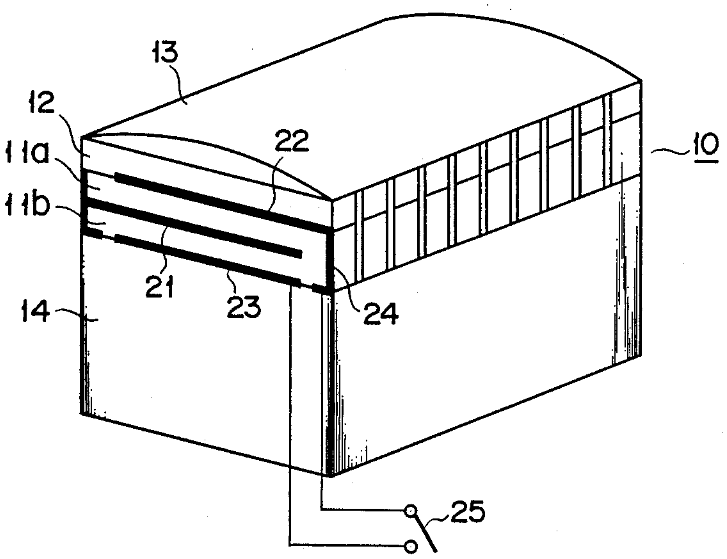
FIG. 5 is a perspective view showing an ultrasonic transducer as another modification used in the ultrasonic imaging apparatus of the present invention.

FIG. 5 shows an ultrasonic transducer according to still another modification. In this modification, external electrode layer 22 and detour electrode 24 are connected to each other. However, detour electrode 24 and external electrode layer 23 are separated from each other, and selectively connected by switch 25. In addition, internal electrode layer 21 is formed at a substantially intermediate position between external electrode layers 22 and 23. Such a multi-layer piezoelectric element is manufactured in the same manner as the above-described elements.

In the ultrasonic transducer in FIG. 5, when switch 25 is turned on, a resonance frequency of v/2t (the sonic velocity of a piezoelectric ceramic material: v, the thickness: t), an ultrasonic wave having a center frequency of substantially f is radiated, and the ultrasonic imaging apparatus is operated in the same manner as in the embodiment of FIG. 2.

When switch 25 is turned off, two resonance frequencies f and 2*f* are generated by the piezoelectric element. That is, when switch 25 is turned off, resonance occurs at a frequency for setting the thickness between internal and external electrode layers 21 and 22 to be a half wavelength. As a result, an ultrasonic wave having center frequency 2*f* is also radiated from piezoelectric element 10. Therefore, a two-frequency ultrasonic transducer capable of generating ultrasonic waves having frequencies f and 2*f* can be obtained. If such an ultrasonic transducer is used, a Doppler signal can be obtained at a low-frequency (f) oscillating portion, and a B mode signal can be obtained at a high frequency (2*f*) oscillating portion.

When a Doppler mode image is to be obtained, it is required that attenuation of an ultrasonic wave in an organism be minimized, and an S/N ratio be increased. For this reason, the low-frequency oscillating portion of the piezoelectric element is driven. In contrast to this, when a B mode image is to be obtained, since a high resolution is required, the high-frequency oscillating portion is driven. In addition, if it is difficult to obtain a signal due to attenuation of an ultrasonic wave when the B mode image of a deep portion of an object to be examined is obtained, switch 25 is turned on to perform two-layer driving, thereby obtaining a high-sensitivity B mode image. By switching switch 25 in this manner, one ultrasonic transducer can be driven such that a high-sensitivity Doppler image and a high-resolution, high-sensitivity B mode image can be obtained in accordance with a purpose and a target portion.

In the above-described apparatus, the impedance per element of an array type ultrasonic transducer is determined by the relative dielectric constant, the number of layers, and the shape of a piezoelectric element. The relationship among the parallel combined impedance of the impedance of the coaxial cable and the input impedance of the receiver section, the impedance of the ultrasonic transducer, and the output impedance of the transmitter section, i.e., the driver source, is associated with transmission and reception sensitivities. Therefore, the number of layers of the piezoelectric element of the ultrasonic transducer is not limited to two, but may be three or more depending on the relative dielectric constant or the shape of a piezoelectric element.

An ultrasonic transducer according to another embodiment of the present invention will be described. This transducer has a fundamental frequency of 5 MHz. The wave-emitting surface of each of its elements has an area about half that of the wave-emitting surface of each element of the transducer described above.

The inventors made an ultrasonic transducer incorporating a two-layer piezoelectric element having a relative dielectric constant of 2000. This transducer exhibited an impedance of 120Ω at the fundamental frequency. The transducer was connected to receive section 4 by coaxial cable 2 (electrostatic capacitance: 110 pF/m; length: 2 m). Cable 2 exhibited an impedance of 130Ω at the fundamental frequency, and receiver section 4 exhibited an impedance of 100Ω. Further, the inventors made another ultrasonic transducer incorporating a conventional one-layer piezoelectric element. This transducer exhibited an impedance of 500Ω at the fundamental frequency. Both transducers were tested for their sensitivity to ultrasonic waves. The transducer according to the invention, which had the two-layered piezoelectric element, had a sensitivity of 10 dB, whereas the transducer, which had the one-layer piezoelectric element, exhibited a sensitivity of 0 dB (i.e., reference value). Also in this embodiment, the relations of $Z_P < P_C$ and $Z_P > Z_C//Z_R$ hold true. Therefore, this embodiment also is more sensitive to ultrasonic waves than the conventional ultrasonic transducers.

According to the present invention, by setting the impedance of the ultrasonic transducer to be smaller than that of the coaxial cable, a reflected wave signal can be transmitted to the receiver section without a great loss of a voltage. Therefore, the reception sensitivity can be effectively increased, and the transmission/reception sensitivity of the ultransonic imaging apparatus can be increased.

What is claimed is:

1. An ultrasonic imaging apparatus comprising:

ultrasonic transducer means for outputting an ultrasonic beam and converting an echo of the ultrasonic beam into an echo signal;

transmitting means for supplying a drive signal to said ultrasonic transducer means to cause said ultrasonic transducer means to output the ultrasonic beam;

receiving means for receiving the echo signal output from said ultrasonic transducer means and converting the echo signal into an image signal; and cable means, having a predetermined capacitive impedance, for coupling said ultrasonic transducer means to said transmitting and receiving means so as to transmit the drive and echo signals, wherein said ultrasonic transducer means comprises an ultrasonic transducer having a capacitive impedance of about 70 to 120 ohms lower than that of said cable means and is coupled without an impedance converter to said transmitting and receiving means.

2. An apparatus according to claim 1, wherein said ultrasonic transducer means is constituted by a plurality of two-layer piezoelectric elements arranged in an array.

3. An apparatus according to claim 2, wherein each of said piezoelectric elements is constituted by two laminated piezoelectric layers, an internal electrode layer interposed between said piezoelectric layers, and two external electrode layers respectively laminated on said piezoelectric layers and connected to each other.

4. An apparatus according to claim 2, wherein each of said piezoelectric layers is formed of a piezoelectric ceramic material having a relative dielectric constant of 2,000.

5. An apparatus according to claim 3, wherein said internal electrode layer is formed between said piezoelectric layers so as to be located at an intermediate position between said two external electrode layers.

6. An apparatus according to claim 3, wherein said internal electrode layer is interposed between said piezoelectric layers so as to be located close to one of said two external electrode layers.

7. An apparatus according to claim 2, wherein each of said piezoelectric elements is formed of the laminated piezoelectric layers, an internal electrode layer interposed between said piezoelectric layers, and two external electrode layers respectively laminated on each piezoelectric layers and selectively connected to each other.

8. An ultrasonic imaging apparatus comprising:

ultrasonic transducer means for outputting an ultrasonic beam and converting an echo of the ultrasonic beam into an echo signal;

transmitting means for supplying a drive signal to said ultrasonic transducer means to cause said ultrasonic transducer means to output the ultrasonic beam;

receiving means, having a predetermined impedance, for receiving the echo signal output from said ultrasonic transducer means and converting the echo signal into an image signal; and cable means, having a predetermined impedance, for coupling said ultrasonic transducer means, which has a predetermined impedance connected in parallel to an input impedance of said receiving means and transmits the drive and echo signals, to said transmitting and receiving means, wherein said ultrasonic transducer means includes an ultrasonic transducer having an impedance of about 70 to 120 ohms lower than a total parallel impedance of said receiving means and said cable means and is coupled without an impedance converter to said transmitting and receiving means.

9. An apparatus according to claim 8, wherein said ultrasonic transducer means is constituted by a plurality of two-layer piezoelectric elements arranged in an array.

10. An apparatus according to claim 9, wherein each of said piezoelectric elements is constituted by two laminated piezoelectric layers, an internal electrode layer interposed between said piezoelectric layers, and two external electrode layers respectively laminted on said piezoelectric layers and connected to each other.

11. An apparatus according to claim 9, wherein each of said piezoelectric layers is formed of a piezoelectric ceramic material having a relative dielectric constant of 2,000.

12. An apparatus according to claim 10, wherein said internal electrode layer is formed between said piezoelectric layers so as to be located at an intermediate position between said two external electrode layers.

13. An apparatus according to claim 10, wherein said internal electrode layer is interposed between said piezoelectric layers so as to be located close to one of said two external electrode layers.

14. An apparatus according to claim 9, wherein each of said piezoelectric elements is constituted by two laminated piezoelectric layers, and internal electrode layer interposed between said piezoelectric layers, and two external electrode layers respectively laminated on said piezoelectric layers and selectively connected to each other.

* * * * *

UNITED STATES PATENT AND TRADEMARK OFFICE

CERTIFICATE OF CORRECTION

PATENT NO. : 4,958,327

DATED : September 18, 1990

INVENTOR(S) : SHIROH SAITOH ET AL.

It is certified that error appears in the above-identified patent and that said Letters Patent is hereby corrected as shown below:

ON TITLE PAGE:

The second Priority data was not included, insert --Aug. 11, 1988 [JP] Japan...........63-200541--

Signed and Sealed this

Twenty-third Day of June, 1992

*Attest:*

DOUGLAS B. COMER

*Attesting Officer*

*Acting Commissioner of Patents and Trademarks*